Jan. 4, 1949.   J. G. STAUS   2,458,219
WHEEL LEVER
Filed March 6, 1946
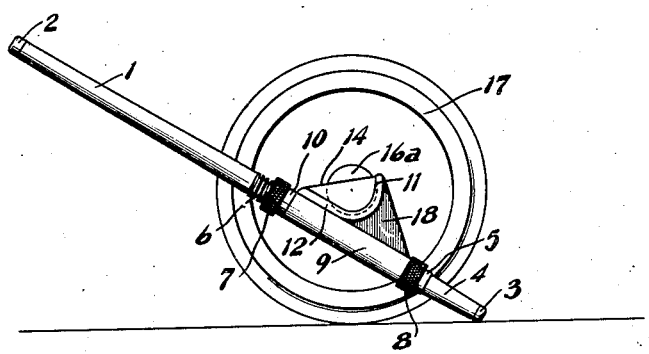
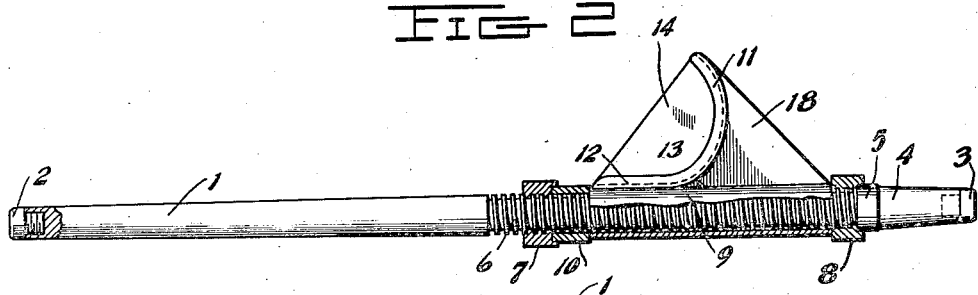
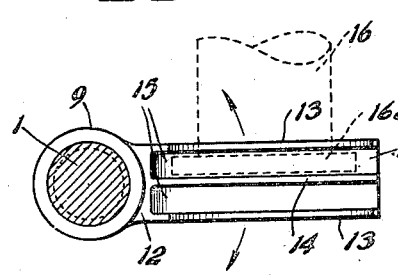
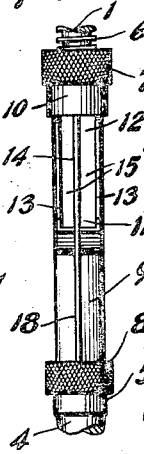
Inventor
John G. Staus
By Clarence A. O'Brien
and Harvey B. Jackson
Attorneys Patented Jan. 4, 1949

2,458,219

UNITED STATES PATENT OFFICE 2,458,219

WHEEL LEVER

John G. Staus, El Paso, Tex.

Application March 6, 1946, Serial No. 652,304

7 Claims. (Cl. 254—38)

This invention relates to a wheel lever and constitutes an improvement over the wheel stick covered by my prior Patent 1,799,185, issued April 7, 1931. When a wheel stick of the construction shown in the prior patent referred to above is in use and an axle raised at one end so that the axle and its wheel may be rolled along the ground in a circular or arcuate path about the stick, the stick must turn during rolling of the axle and its wheel. This has been found objectionable as the stick must turn in the hand of the workman holding the same. Therefore, one object of this invention is to provide a wheel stick or lever carrying an axle engaging member so mounted that it may turn about the lever and thus allow the axle and wheels carried thereby to be rolled along the ground in a circular or arcuate path without the lever turning in the workman's hand.

Another object of the invention is to provide the wheel lever with an axle-engaging member so mounted that it may be moved along the lever longitudinally thereof to adjusted position, and thus accommodate the device to wheels of various diameters.

Another object of the invention is to provide a wheel lever wherein collars or stops which hold the axle-engaging member in adjusted position along the lever may be so adjusted that while they will allow the sleeve of the axle-engaging member to turn about the lever, they will prevent it from turning too freely.

Another object of the invention is to provide a wheel lever which is simple in construction and very strong and not liable to be broken when subjected to rough usage.

The invention is illustrated in the accompanying drawing, wherein—

Figure 1 is a side view showing the improved wheel lever in use,

Figure 2 is a view showing the device partially in elevation and partially in longitudinal section, Figure 3 is a view showing the lever in transverse section and looking down upon the axle-engaging member, and Figure 4 is a fragmentary view looking at the front of the wheel lever.

The bar or lever 1 of this improved wheel lever is formed of strong metal and may be of any desired length and diameter, ends of the bar or lever being formed with threaded sockets to receive ferrules 2 and 3. The forward end portion of the bar or lever is tapered somewhat to form a tip 4 having the ground-engaging ferrule 3 at its front end and at its rear end the tip is formed with a shoulder 5. Above the shoulder 5, the lever is threaded for approximately half its length, as shown at 6, and this threaded portion of the lever carries collars 7 and 8. The bar or lever tapers rearwardly from the rear end of its threaded portion sufficiently to permit the nuts or collars 7 and 8 to be slid along the lever and then threaded upon the lever, and from an inspection of Figure 2, it will be seen that when the nut or collar 8 is in place, it has abutting engagement with the shoulder 5. A sleeve 9 fits loosely about the lever between the nuts or collars 7 and 8 and between the sleeve or tube 9 and the collar 7 is disposed a sleeve 10 which also fits loosely about the lever. When the nut 7 is tightened to a desired extent, the tube 9 will be allowed to turn about the threaded portion of the lever, but it will be prevented from turning too freely when the device is in use. An arcuate bill or bracket 11 projects from the tube 9 and the shank 12 of this bill or bracket is welded to the tube and is of such length that it will be very firmly held to the tube and not liable to break loose during use of the device. Side flanges 13 extend along side edges of the bill and its shank, and midway the width of the bracket and its shank there has been provided a web 14 which divides the bracket midway its width and cooperates with the flanges 13 to form channels or seats 15. It will thus be seen that when the device is in use, either end of an axle 16 may have its head or collar 16a engaged in a seat 15 and the rear end of the lever then pushed upwardly and forwardly so that it will be locked to a vertical position and rest upon its lower end with the wheel 17 adjacent the end of the axle engaged by the wheel lever supported above the ground. A web 18 which extends longitudinally of the tube between the bracket 11 and the front end of the tube reinforces the bill or bracket and prevents it from being broken by the weight of the axle and the car wheel which have been lifted from the ground. After an end of the axle has been shifted upwardly and the adjacent wheel raised to a position out of contact with the ground, a workman serving as helper to the workman operating the wheel lever may apply rolling motion to the wheel at the opposite end of the axle from the lever and this wheel will roll along the ground and the head 16a of the axle engaged in the seat of the bracket or bill 11 will turn in this seat. The wheel pushed by the helper moves in a circular or arcuate path and during this movement the tube or sleeve 9 turns about the lever and the workman operating the lever may hold it firmly in his hand, as the lever does not turn with the tube or sleeve 9. When the wheel lever is used for raising an end of an axle carrying small wheels which may be of thirty-three inch diameter, the sleeve or collar 10 is disposed between the nut 7 and the upper or rear end of the tube 9, but when a larger wheel having a diameter of thirty-six inches is to be raised from the ground, the nut 7, the collar 10, and the tube 9 will be slid rearwardly off of the lever and then reassembled with the sleeve or collar 10 disposed between the front end of the tube 9 and the nut 8 and thus dispose the axle-engaging bracket or bill a greater distance from the front end of the lever and permit the device to accommodate itself to the larger wheel.

While it has been stated that the lever is to be used for lifting axles provided with 33-inch wheels and 36-inch wheels, it will be understood that these are merely illustrative diameters of the wheels and that the lever may be used for lifting axles carrying wheels of other diameters. By properly adjusting the upper nut 7, the sleeve or tube 9 may be allowed to turn about the lever but prevented from turning too freely. Therefore, the axle-engaging member will be prevented from turning too freely about the lever and accidentally slipping out of engagement with the axle which is being lifted.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

What is claimed is:

1. A wheel stick comprising a lever and an axle-engaging member carried by said lever intermediate the ends thereof and movable about the bar circumferentially thereof.

2. A wheel stick comprising a lever and an axle-engaging member carried by said lever intermediate the ends thereof, the axle-engaging member being movable about the lever and adjustably shiftable along the lever.

3. A wheel stick comprising a lever, nuts in threaded engagement with an intermediate portion of said lever, a tube fitting about the lever between said nuts, and means extending from said tube for engaging under and supporting an axle to be lifted by the lever.

4. A wheel lever comprising a bar threaded for a portion of its length and having a circumferentially extending abutment shoulder at the front end of its threaded portion, a nut screwed upon said bar and abutting said shoulder, a tube fitting about the threaded portion of said bar with its front end bearing against said nut, a sleeve about said bar engaging the rear end of said tube, a nut screwed upon said bar and engaging the rear end of said sleeve and applying pressure to the tube to control turning movement of the tube about the bar, a bracket having a shank rigidly carried by said tube and an arcuate bill extending from its shank from the tube radially thereof, flanges extending along side edges of the shank and bill, a web midway the width of said bracket cooperating with the flanges to form seats for an axle head at opposite sides of the web, and a reinforcing web between said bill and the front end of the tube.

5. A wheel lever comprising a bar threaded for a portion of its length, a lower nut upon the threaded portion of said bar, an upper nut upon the threaded portion of said bar, a tube fitting about the threaded portion of the bar between said nuts and rotatable about the bar, said nuts applying pressure to ends of the tube for controlling rotation of the tube about the bar, and a member projecting from the tube for engaging under an end of an axle, the distance between the axle-engaging member and the lower end of the bar being greater than a radius of a wheel on said axle whereby the bar may be tilted to a vertical position after engagement with an end of an axle and the wheel held out of contact with the ground.

6. A wheel stick comprising a lever, a ground-engaging member at the front end of said lever, a sleeve fitting about an intermediate portion of said lever and rotatable thereon, an axle-engaging member projecting from said sleeve, and means for maintaining said sleeve in predetermined spaced relation to the front end of said bar whereby the wheel lever may be adjusted to accommodate it to axles carrying wheels of different diameters.

7. A wheel stick comprising a lever having a ground-engaging front end, a sleeve rotatably mounted on an intermediate portion of said lever and provided with means for engaging under an end of an axle, and means carried by said lever for rotatably supporting said sleeve and holding the sleeve in predetermined spaced relation to the front end of the lever.

JOHN G. STAUS.

REFERENCES CITED

The following references are of record in the file of this patent:

UNITED STATES PATENTS

| Number | Name | Date |
| --- | --- | --- |
| 207,909 | Smith | Sept. 10, 1878 |
| 1,325,964 | Templeton | Dec. 23, 1919 |
| 1,499,280 | Alheit | June 24, 1924 |
| 1,799,185 | Staus | Apr. 7, 1931 |
| 2,054,568 | Beach | Sept. 15, 1936 |